(12) United States Patent
Koskelainen

(10) Patent No.: US 7,894,456 B2
(45) Date of Patent: Feb. 22, 2011

(54) ROUTING DATA PACKETS FROM A MULTIHOMED HOST

(75) Inventor: Juha Koskelainen, Helsinki (FI)

(73) Assignee: Nokia Corporation, Espoo (FI)

( * ) Notice: Subject to any disclaimer, the term of this patent is extended or adjusted under 35 U.S.C. 154(b) by 701 days.

(21) Appl. No.: 11/273,399

(22) Filed: Nov. 15, 2005

(65) Prior Publication Data
US 2007/0058606 A1   Mar. 15, 2007

(30) Foreign Application Priority Data
Sep. 15, 2005   (FI) .................................. 20050919

(51) Int. Cl.
*H04L 12/28* (2006.01)
*H04L 12/56* (2006.01)

(52) U.S. Cl. .................... 370/401; 370/252; 370/254; 370/351; 370/352; 370/389; 370/400

(58) Field of Classification Search ................ 370/252, 370/254, 389, 400
See application file for complete search history.

(56) References Cited

U.S. PATENT DOCUMENTS

| | | | |
|---|---|---|---|
| 5,996,021 A * | 11/1999 | Civanlar et al. ............. 709/238 |
| 6,064,671 A | 5/2000 | Killian | |
| 6,119,170 A * | 9/2000 | Schoffelman et al. ........ 709/244 |
| 6,931,018 B1 | 8/2005 | Fisher | |
| 7,594,031 B2 * | 9/2009 | Horton et al. ................ 709/245 |
| 2002/0145981 A1 * | 10/2002 | Klinker et al. ............... 370/244 |
| 2005/0047348 A1 * | 3/2005 | Suzuki et al. ................ 370/252 |
| 2005/0213574 A1 * | 9/2005 | Yoshimura et al. ........... 370/389 |

FOREIGN PATENT DOCUMENTS

EP     1 511 249 A2     3/2005

OTHER PUBLICATIONS

International Search Report PCT/FI2006/000293 filed Sep. 1, 2006.

* cited by examiner

*Primary Examiner*—Daniel J Ryman
*Assistant Examiner*—Jae Y Lee
(74) *Attorney, Agent, or Firm*—Mintz Levin Cohn Ferris Glovsky and Popeo, P.C.

(57) ABSTRACT

The invention allows routing data packets from a multihomed host. A default gateway is associated with each of network addresses associated with the multihomed host. One of the associated network addresses is assigned to a data packet to be sent from the multihomed host as its source address. A routing table of the multihomed host is searched for a route matching a destination address of the data packet. It is determined, in response to one of no route found and the found route being a default route of the routing table, which of the default gateways is associated with the assigned source address, and the data packet is dispatched to this determined default gateway.

8 Claims, 3 Drawing Sheets

ROUTING DATA PACKETS FROM A MULTIHOMED HOST

BACKGROUND OF THE INVENTION

1. Field of the Invention

The invention relates to telecommunications. In particular, the invention relates to a novel and improved method and system for routing data packets from a multihomed host.

2. Description of the Related Art

Communications networks, particularly packet switched data communication networks or packet data networks such as Internet Protocol (IP) based networks, typically comprise a number of nodes connected to each other by links.

The term 'link' refers to a communication facility or medium over which nodes can communicate at the Open Systems Interconnection (OSI) data link layer. Nodes are devices which typically implement Internet Protocol. A node that sends or originates data packets is known in the art as a 'host' or, more particularly, a sending host. Correspondingly, a node that receives data packets explicitly addressed to itself is also known in the art as a 'host' or, more particularly, a receiving host. The term 'router', on the other hand, refers to a node that forwards IP packets not explicitly addressed to itself. Furthermore, the router performs this forwarding on the Open Systems Interconnection network layer.

Thus, by using hosts and links, local networks may be arranged. A local network may be e.g. a Local Area Network (LAN). A local network may in turn be connected to another local network or to e.g. Internet by using a router.

Therefore, in order for a host in a given local network to be able to send or receive data packets outside of its local network, the local network needs to be linked to at least one router which is able to route data packets to and from outside the local network. In the context of the present invention, such a router is called a 'gateway'.

Even though routers are the nodes responsible for actual routing in a network, a host typically also comprises a simple routing table. The routing table of a host is a look-up table which comprises routing entries which a sending host utilizes in determining where to dispatch a data packet to be sent to its destination. The data packet to be sent comprises a destination address, which typically is an Internet Protocol address of the destination of the data packet. The sending host goes through the routing entries comparing them to the destination address of the data packet to be sent, and looks for a routing entry that best matches the destination address of the data packet.

Typically some of the routing entries point to other hosts in the local network of the sending host, i.e. they define 'host routes'. If the local network is a large one comprising locally linked subnetworks, some of the routing entries may point to these subnetworks, i.e. they define 'subnet routes'. The sending host goes through its routing entries from the specific to the general. In other words, it first tries to find an exactly matching host route. If it cannot find an exactly matching host route, it then tries to find a matching subnet route, if the routing table includes them. In addition to the host routes and subnet routes, the routing table may comprise a routing entry which defines a 'default route'. The default route is used as a last resort if no matching routing entry can be found. In other words, the default route is used if the host cannot locate the destination of the data packet at the local network of the host. The default route points to a router, called a 'default gateway', which is able to forward the data packet towards its destination address. Thus the default gateway is typically used in cases where the destination of the data packet is located outside of the local network, since typically the simple routing table of a host comprises routing entries related only to the local network of the host. If the routing table of a host does not comprise a default route and no matching routing entry can be found, the data packet to be sent is typically discarded.

Typically a host comprises one network interface which typically has one network address, such as an Internet Protocol address, associated with it. Each host is typically assigned a default gateway which is associated with the network interface of the host, or more particularly, with the associated network address of the network interface of the host. Information about the assigned default gateway is typically stored in the routing table of the host.

As described above, a host typically comprises one network interface with one associated network address. However, a host may comprise multiple network interfaces, each with their own associated non-loopback network address, such as a non-loopback Internet Protocol address. Furthermore, a host may comprise a network interface with multiple associated non-loopback network addresses, such as non-loopback Internet Protocol addresses. Such a host is known in the art as a 'multihomed' host. Typically, network interfaces of a multihomed host each interface to a different network. In such a case the multihomed host will have multiple network addresses on the different networks with different network prefixes.

As described above, a multihomed host has multiple non-loopback network addresses associated with it. Therefore, a receiving multihomed host may be reached under multiple network addresses. A network may be configured in such a way that data packets travel on physically different paths towards the receiving multihomed host depending on which of the multiple network addresses of the receiving multihomed host is used as the destination address of each data packet. Such an arrangement is typically used to protect against physical network failures and changing network conditions. Today multihoming is often used together with Stream Control Transmission Protocol (SCTP) which allows transmitting multiple streams of data at the same time between two hosts that have established a connection in a network.

Just as a receiving multihomed host may be reached under its multiple network addresses, a sending multihomed host may use one of its multiple network addresses as a source address for a data packet to be sent from the multihomed host. In a first arrangement, the source address is explicitly assigned, often by the application sending the data packet. In other words, the source address and the associated network interface of the multihomed host are known before the data packet is sent. In a second arrangement, the source address is unknown while the data packet is being sent. This is a typical case for a client requesting a service over a network. In the second arrangement, the source address is typically assigned after searching the routing table of the sending host. The search of the routing table of the sending host will return both information about the selected next-hop node and information regarding which of the network interfaces of the multihomed host is connected to the link to the selected next-hop node. The network address associated with this network interface will then be assigned as the source address of the data packet.

Although multihoming generally provides reasonable protection against physical network failures and changing network conditions, there still is a severe drawback with multihoming which relates to default gateways.

As described above, a routing table, whether that of a conventional host or of a multihomed host, comprises exactly one default route which points to exactly one default gateway. More particularly, the routing table comprises exactly one active default route. That is, although one typically can assign a different default gateway to each network interface of a host or each network address of the host, there is only a single active default route in the routing table of the host. Typically this single active default route points to one of the assigned different default gateways. In some cases, the one default gateway of the assigned different default gateways to which the active default route points to, is chosen randomly, e.g. while initializing the host and its Internet Protocol stack. This randomness may lead to confusion and loss of connectivity. Furthermore, in a case where a sending host comprises multiple network interfaces, only locally linked hosts and those non-locally linked hosts which are reachable by the active default gateway, may be reached by the sending host via any of its network interfaces.

Furthermore, since there is only a single default gateway assigned at any given time, this default gateway constitutes a potential single point of failure. That is, if anything happens to the default gateway, the entire routing arrangement fails.

Obviously, the existence of a potential single point of failure is something that must be avoided, particularly in fault tolerant systems, such as e.g. telecommunications networks. Likewise, a host communicating with multihoming Stream Control Transmission Protocol needs to avoid the existence of potential single points of failure.

Prior art includes some techniques which attempt to prevent a single default gateway of a multihomed host from becoming a single point of failure. However, these techniques have serious additional drawbacks of their own.

One such prior art technique is the use static routes in the routing table of a host. The term 'static route' refers to a route that is added manually to the routing table of the host. One may e.g. add a route pointing to a locally linked gateway other than an assigned active default gateway. In other words, this added static route is a 'gateway route'. Furthermore, one may define the static gateway route so that data packets destined to a given network or group of networks will be dispatched from the sending host to this locally linked gateway. Obviously, one may add multiple static routes. Yet, there are severe drawbacks associated with the use of static routes. One such drawback is lack of scalability. Each time a new destination network needs to be made visible to existing hosts of a local network, it requires either a new static route to be added or using the default route. Therefore, establishing new destination networks may require configuring routing tables of each host of the local network. This, in turn, is a major drawback in case of large local networks. Furthermore, the larger the amount of manually maintained static routes, the larger the possibility of human errors.

However, a routing table of a host, including its static routes, may be configured and updated automatically by using dynamic routing protocols, such as Open Shortest Path First (OSPF) protocol. In this way, human errors are mostly eliminated. Yet, dynamic routing protocols have drawbacks of their own, particularly in cases where fault tolerance is required. For example, it takes a relatively long period of time to obtain the network topology at unit start-up phase, since information about the network topology is gathered from various routers around the network. In case of a fault tolerant service that time may cause a break in the service. Yet, particularly in extremely fault tolerant systems any breaks need to be avoided. Furthermore, running a dynamic routing daemon at a multihomed host complicates the configuration of the host. Furthermore, security and configuration problems may arise if the existing network topology needs to be more open. Furthermore, Internet Protocol Version 6 (IPv6) support for dynamic routing may be missing. Even though Internet Protocol Version 6 is a quite generally spread protocol, it is still an open question whether a fault tolerant service should be based on an Internet Protocol Version 6 based dynamic routing protocol, such as Open Shortest Path First Version 3 (OSPFv3).

Prior art further includes a solution introduced by Linux community, known as 'Policy Routing'. Policy Routing provides a framework for a router in making a forwarding decision based on information other than the destination Internet Protocol address of a forwarded Internet Protocol packet, e.g. based on the source Internet Protocol address of the forwarded Internet Protocol packet, or a transport protocol port. In short, the Policy Routing consists of building up a database of active policy rules, prioritizing those rules, and describing an action matching a rule for an Internet Protocol packet to be routed. However, the implementation of the Policy Routing is a complex one: e.g. each policy rule may have a whole routing table of its own. Further information about Policy Routing is available e.g. on http://www.policyrouting.org.

Therefore, the object of the present invention is to alleviate the problems described above and to introduce a solution that allows routing data packets from a multihomed host in a way that allows multiple default gateways being utilized by the multihomed host.

SUMMARY OF THE INVENTION

A first aspect of the present invention is a method of routing data packets from a multihomed host. A source address is assigned to a data packet to be sent from the multihomed host. The multihomed host has at least two associated network addresses, and a default gateway is associated with each of the at least two associated network addresses. At least two of the network addresses of the multihomed host are associated with different default gateways. Furthermore, the assigned source address is one of the at least two associated network addresses.

A destination address of the data packet is determined. A routing table of the multihomed host is searched for a route for the data packet, which route is to match the destination address of the data packet.

The results of the search are examined. It is determined, in response to one of no route found and the found route being a default route of the routing table, which of the above default gateways is associated with the assigned source address, and the data packet is dispatched to this determined default gateway associated with the assigned source address.

A second aspect of the present invention is a multihomed host. The multihomed host of the second aspect of the present invention comprises a source address assigner configured to assign a source address to a data packet to be sent from the multihomed host. The multihomed host of the second aspect of the present invention has at least two associated network addresses, and a default gateway is associated with each of the at least two associated network addresses. Furthermore, the assigned source address is one of the at least two associated network addresses.

The multihomed host of the second aspect of the present invention further comprises a destination address determinator configured to determine a destination address of the data packet. The multihomed host of the second aspect of the present invention further comprises a routing table searcher configured to search a routing table of the multihomed host for a route for the data packet, which route is to match the destination address of the data packet.

The multihomed host of the second aspect of the present invention further comprises a search examiner configured to examine the results of the search. The multihomed host of the second aspect of the present invention further comprises an over-rider configured to determine, in response to one of no route found and the found route being a default route of the routing table, which of the above default gateways is associated with the assigned source address; and further configured to dispatch the data packet to this determined default gateway associated with the assigned source address.

A third aspect of the present invention is a multihomed host. The multihomed host of the third aspect of the present invention comprises a source address assigning means for assigning a source address to a data packet to be sent from the multihomed host, which multihomed host has at least two associated network addresses, and a default gateway is associated with each of the at least two associated network addresses. Furthermore, the assigned source address is one of the at least two associated network addresses.

The multihomed host of the third aspect of the present invention further comprises a destination address determining means for determining a destination address of the data packet. The multihomed host of the third aspect of the present invention further comprises a routing table searching means for searching a routing table of the multihomed host for a route for the data packet, which route is to match the destination address of the data packet.

The multihomed host of the third aspect of the present invention further comprises a search examining means for examining the results of the search. The multihomed host of the third aspect of the present invention further comprises an over-riding means for determining, in response to one of no route found and the found route being a default route of the routing table, which of the above default gateways is associated with the assigned source address; and for dispatching the data packet to the determined default gateway associated with the assigned source address.

A fourth aspect of the present invention is a computer program embodied on a computer readable medium for routing data packets from a multihomed host. The computer program controls a data-processing device to perform the steps of:

assigning a source address to a data packet to be sent from the multihomed host, the multihomed host having at least two associated network addresses, a default gateway associated with each of the at least two associated network addresses, and the source address being one of the at least two associated network addresses;

determining a destination address of the data packet;

searching a routing table of the multihomed host for a route for the data packet, the route to match the destination address of the data packet;

examining the results of the search; and in response to one of no route found and the found route being a default route of the routing table:

determining the default gateway associated with the assigned source address; and dispatching the data packet to the determined default gateway associated with the assigned source address.

In an embodiment of the invention, the default gateway associated with the assigned source address is determined, in response to the found route being a gateway route, and the data packet is dispatched to the determined default gateway associated with said assigned source address.

The invention allows routing data packets from a multihomed host in a way that allows multiple default gateways being utilized by the multihomed host. As a result, the invention allows configuration simplicity and scalability in routing data packets from the multihomed host. Furthermore, the invention does not break any existing functionality: for example, the invention requires no change in transport protocols. The invention allows replacing static routes, thus easing multihomed host configuration. Yet, at the same time, static routes may still be used together with the invention: since any static route is a more exact match than any default route, the static route will override the default route. As a result, the invention does not break any existing functionality that may have been configured with the static routes. Furthermore, since the routing table of a host is left unchanged by the invention, changes are not visible to the Internet Protocol routing daemon of the host.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

Figure 1:
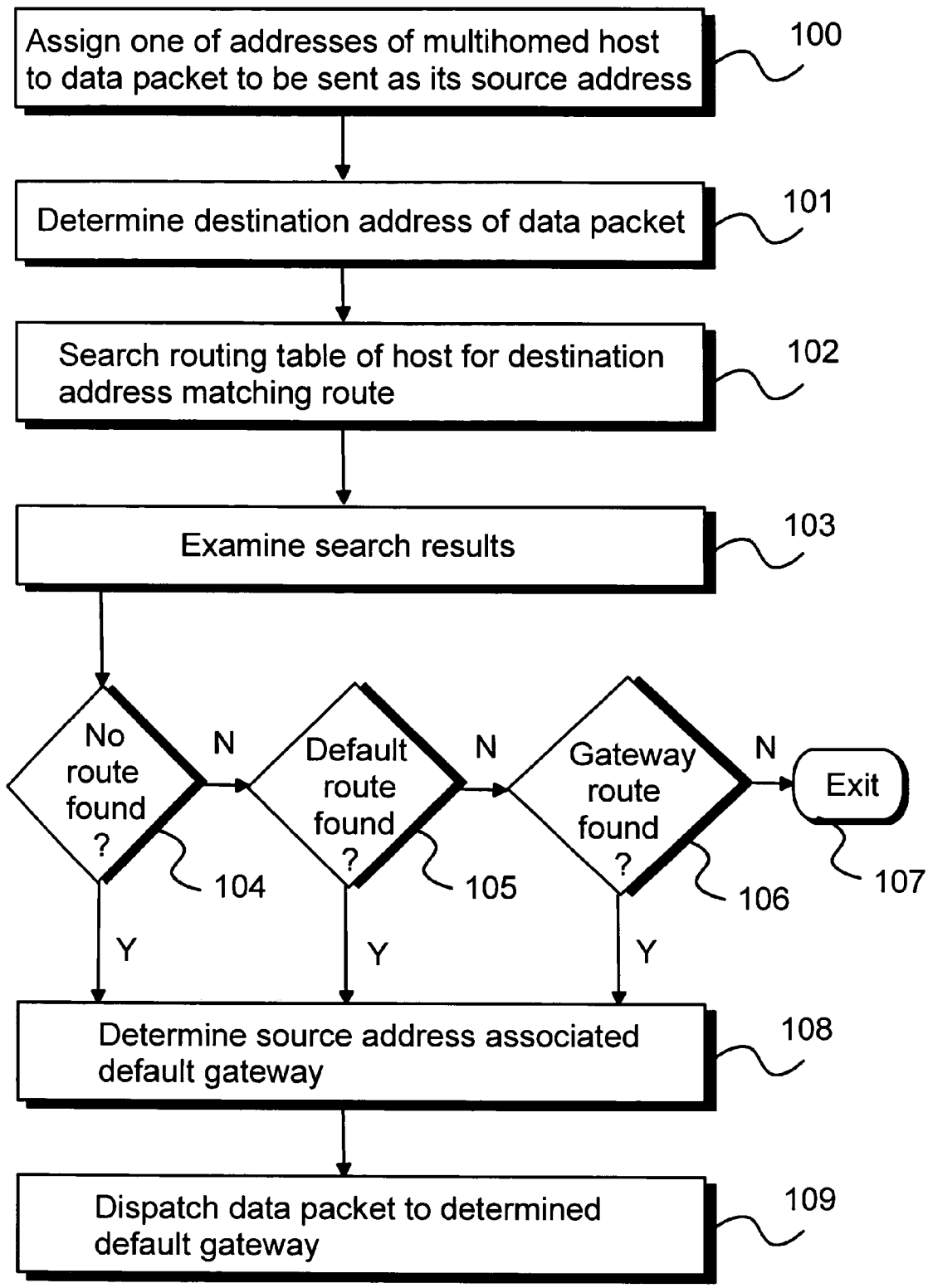
FIG. 1 is a flow diagram illustrating a method according to an embodiment of the present invention.

FIG. 1 illustrates an embodiment of the method of the present invention relating to routing data packets from a multihomed host.

A source address is assigned to a data packet which is to be sent from the multihomed host, step 100. The multihomed host has at least two associated network addresses, and a default gateway is associated with each of the at least two associated network addresses. At least two of the network addresses of the multihomed host are associated with different default gateways. Furthermore, the assigned source address is one of the at least two associated network addresses.

At step 101, a destination address of the data packet is determined. Typically the determination of the destination address will be performed by searching for the destination address in the header of the data packet. Having determined the destination address, a routing table of the multihomed host is searched for such a route for the data packet which route will best match the destination address, step 102.

Next, the search results are examined, step 103. In the embodiment of the present invention illustrated in FIG. 1, it is determined whether no route at all was found in the search, step 104. In response to some route found, it is then determined whether the found route is the default route of the routing table of the multihomed host, step 105. In response to no default route found, it is then determined whether the found route is a gateway route of the routing table of the multihomed host, step 106.

In response to no gateway route found, the examination process will exit, step 107, since this indicates that the found route is a matching host route or subnet route. In this case the data packet may be routed to the respective host or subnetwork in accordance with prior art.

It is to be understood that step 106 of FIG. 1 is an optional one. That is, the examination process may alternatively exit in response to no default route found.

In response to no route found, in response default route found, and in response to a gateway route found, it is then determined which of the multiple default gateways locally linked to the multihomed host is associated with the assigned source address of the data packet, step 108. At step 109, the data packet is dispatched to this determined default gateway that is associated with the assigned source address.

Figure 2A:
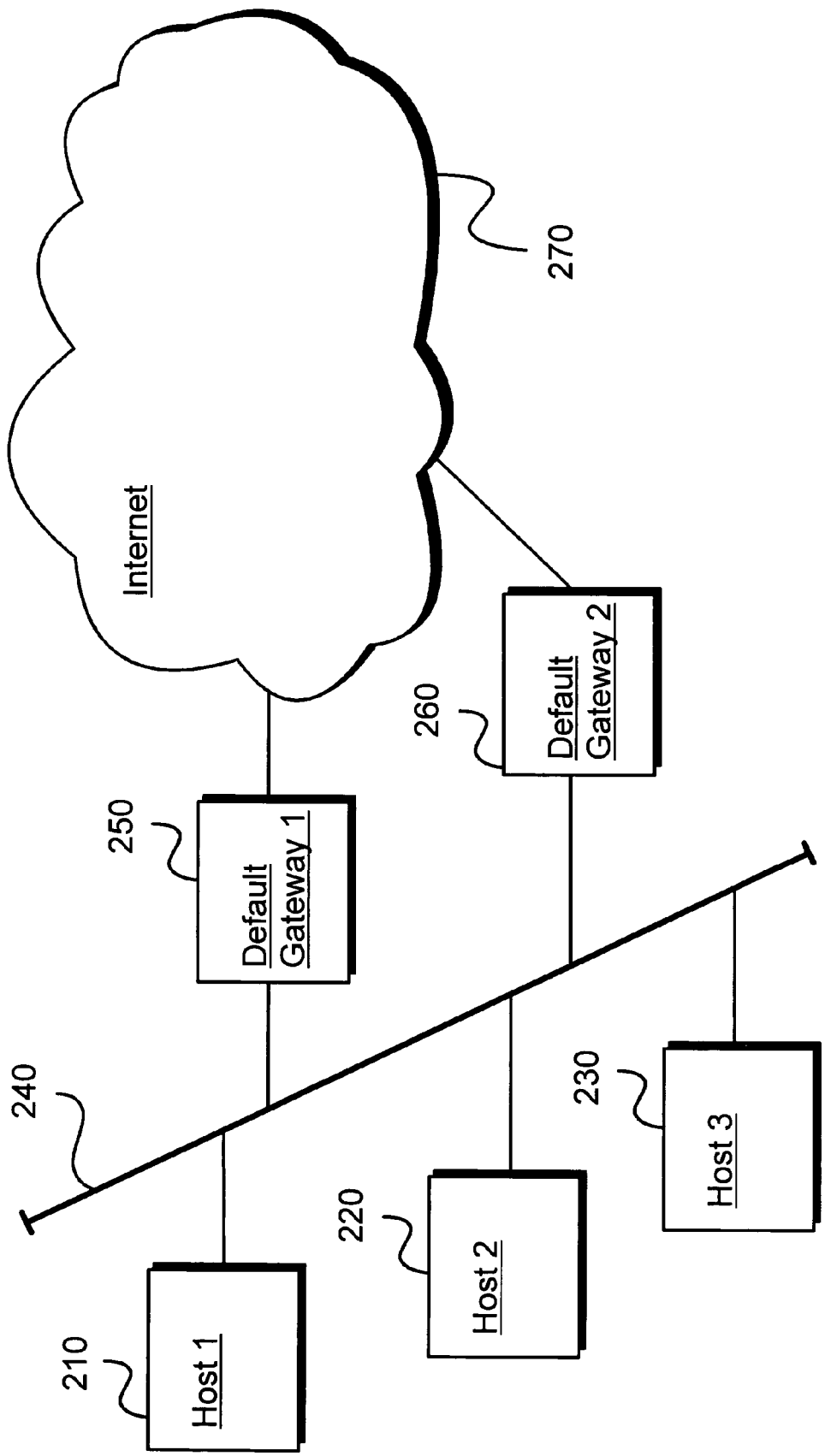
FIG. 2a is a block diagram illustrating an embodiment of a multihomed host of the present invention in a networking environment.
Figure 2B:
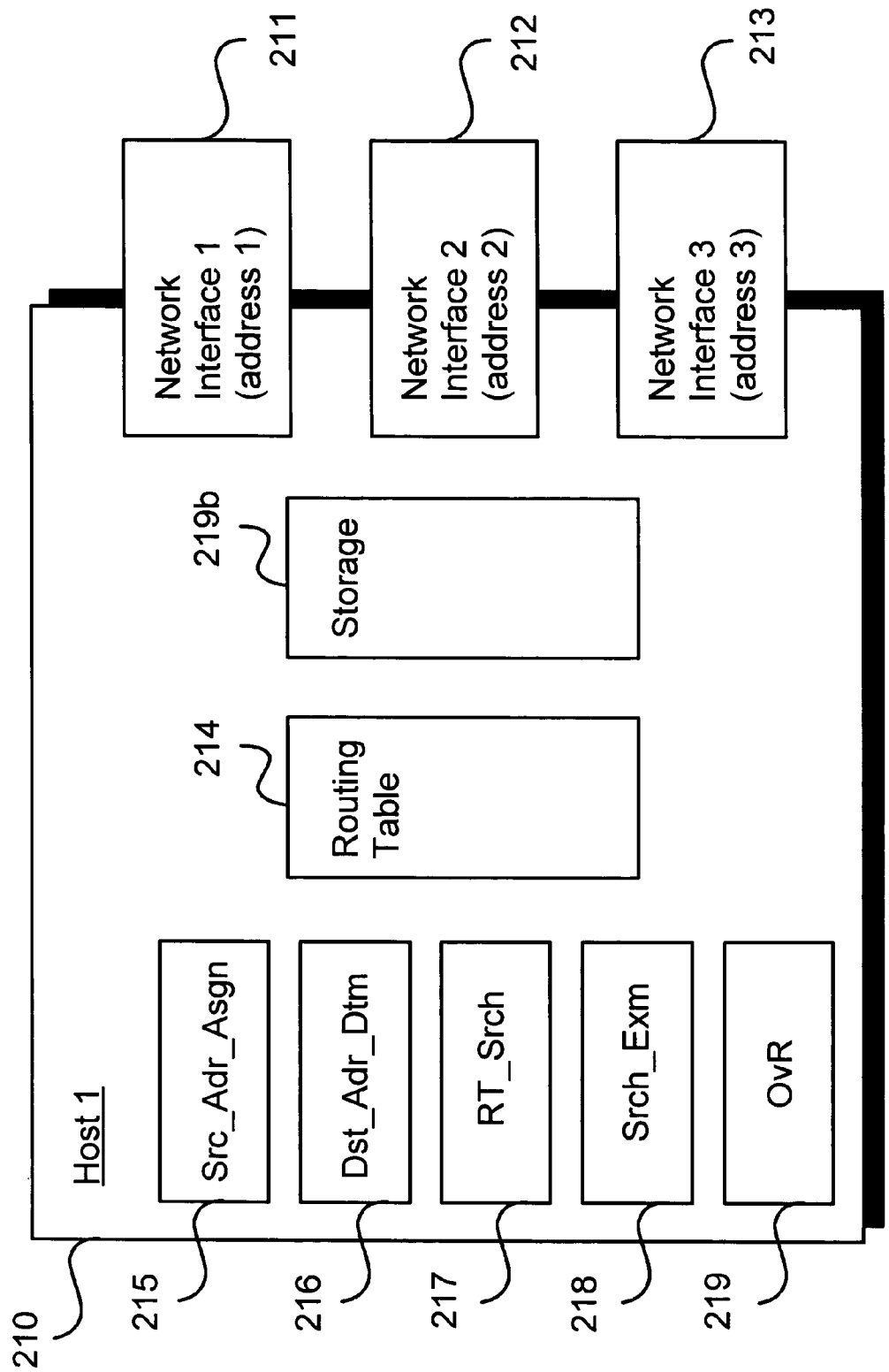
FIG. 2b is a block diagram illustrating in more detail a multihomed host according to an embodiment of the present invention.

FIGS. 2a-2b illustrate an embodiment of the multihomed host of the present invention. FIG. 2a illustrates on a general level an embodiment of the multihomed host of the present invention in a networking environment, whereas FIG. 2b illustrates the multihomed host of the present invention in more detail.

FIG. 2a discloses a local network 240, such as a Local Area Network. Three hosts, 210, 220 and 230 are linked to the local network 240. Furthermore, two routers, 250 and 260, which are able to function as default gateways, are linked to the local network 240. Furthermore, both of the routers 250 and 260 are connected to an External network 270, such as e.g. the Internet.

The host 210 is a multihomed host, comprising three network interfaces, 211, 212 and 213. Each of the network interfaces 211, 212 and 213 has its own associated network address, such as an Internet Protocol address. In the embodiment of the present invention illustrated in FIG. 2, all three network interfaces 211, 212 and 213 are linked to the local network 240. However, as is obvious to one skilled in the art, not all of the network interfaces of a multihomed host need to be linked to a same local network. Rather, at least one of the network interfaces of a multihomed host may be linked to a different local network than the rest of the network interfaces of the multihomed host.

As a result of comprising the three network interfaces 211, 212 and 213, each with its own associated network address, the multihomed host 210 may be reached via three different network addresses: address 1, address 2 and address 3. Correspondingly, when a data packet is dispatched from the multihomed host 210, any one of the three different network addresses may be assigned as a source address of the data packet.

One of the routers 250 and 260 is assigned as a default gateway for the network address 1 associated with the network interface 211. Correspondingly, one of the routers 250 and 260 is assigned as a default gateway for the network address 2 associated with the network interface 212. Correspondingly, one of the routers 250 and 260 is assigned as a default gateway for the network address 3 associated with the network interface 213. As an example, let us say that the router 250 is assigned as the default gateway for the network address 1 associated with the network interface 211, the router 260 is assigned as the default gateway for the network address 2 associated with the network interface 212, and the router 260 is also assigned as the default gateway for the network address 3 associated with the network interface 213.

It is to be noted that while some prior art techniques allow assigning a different default gateway to each network address of a multihomed host, only one of the assigned different default gateways may actually be used at any given time, because prior art allows no more than one active default route to be comprised in a routing table of a host regardless of whether the host is a multihomed host or a non-multihomed host. That is, in prior art data packets dispatched from any network interface of a multihomed host and destined towards outside of the local network of the multihomed host will be sent to the router pointed to by the default route of the routing table of the multihomed host, regardless of any network interface or network address specific default gateway assignments. To switch to use a router other than the one pointed to by the default route of the routing table of the multihomed host would require e.g. re-initialization of the Internet Protocol stack of the respective multihomed host, which would be a relatively time consuming process and which would cause a break in a network service provided by the respective multihomed host. In other words, the switch to another default gateway is not an option e.g. in case of a fault tolerant system. Yet, a single router used as a default gateway is a potential single point of failure, which again is unacceptable in case of a fault tolerant system. The present invention, on the other hand, allows utilizing any of available default gateways dynamically as needed, without service breaks and without time delays.

Furthermore, there are such prior art techniques utilizing multiple default gateways which randomly dispatch each data packet to be sent from a multihomed sending host to one of the multiple default gateways. As a result, end-to-end routes will be random for transport layer protocols, such as Stream Control Transmission Protocol, Transmission Control Protocol (TCP) and User Datagram Protocol (UDP). Yet, random end-to-end routes are particularly unsuitable when using multihoming together with Stream Control Transmission Protocol.

The multihomed host 210 further comprises a routing table 214. Since the present invention requires no changes to routing tables, the routing table 214 may be a conventional prior art routing table, comprising e.g. at least one host route, at least one subnet route, and optionally one or more gateway routes. In addition, the routing table 214 may comprise a default route. However, as is known in the art, the routing table 214 may comprise no more than one default route, that is, no more than one active default route.

The multihomed host 210 further comprises a source address assigner 215 configured to assign a source address to a data packet to be sent from the multihomed host 210. The assigned source address is one of the above three different network addresses associated with the three network interfaces 211, 212 and 213 of the multihomed host 210. To continue the above example, let us say the data packet is assigned the network address 1 associated with the network interface 211 as its source address.

The multihomed host 210 further comprises a destination address determinator 216 configured to determine a destination address of the data packet. Typically the destination address determinator 216 will search for the destination address in the header of the data packet to be sent. To continue the above example, let us say the destination address of the data packet is a network address, such as an Internet Protocol address, of a node located in the External network 270.

The multihomed host 210 further comprises a routing table searcher 217 configured to search the routing table 214 of the multihomed host 210 for a route for the data packet to be sent. That is, the routing table 214 is searched for a route that best matches the destination address of the data packet.

The multihomed host 210 further comprises a search examiner 218 configured to examine the results of the performed search. To continue the above example, since the destination address of the data packet is an address of a node located outside the local network 240, no exact match will be found at the routing table 214 of the host 210, and the routing table search will result in the found route being the default route of the routing table 214.

The multihomed host 210 further comprises an over-rider 219 configured to determine, in response to one of no route found and the found route being the default route of the routing table 214, which of the default gateways 250 and 260 is associated with the assigned source address. The over-rider 219 is further configured to dispatch the data packet to this determined default gateway associated with the assigned source address. Furthermore, in an embodiment of the present invention, the over-rider 219 is configured to perform the above determining the associated default gateway and the above dispatching the data packet to this determined default gateway in response to the found route being a gateway route of the routing table 214. To continue the above example, since the data packet was assigned network address 1 as its source address, and since the router 250 was assigned as the default gateway for the network address 1, the data packet will be dispatched to the router 250 which in turn will forward the data packet towards its destination node in the External network 270.

Furthermore, in an embodiment of the present invention, the multihomed host 210 further comprises a storage 219b configured to store information about which default gateway is associated with which network address of the multihomed host 210. In this embodiment the over-rider 219 will search the storage 219b to discover the default gateway associated with the assigned source address. To continue the above example, the storage 219b may e.g. comprise the information that the router 250 is assigned as the default gateway for the network address 1 associated with the network interface 211, the router 260 is assigned as the default gateway for the network address 2 associated with the network interface 212, and the router 260 is assigned as the default gateway for the network address 3 associated with the network interface 213. It is to be noted that even though the storage 219b is illustrated in FIG. 2b as a separate entity for the sake of clarity, the storage 219b may be implemented by integrating it with another component comprised in the multihomed host 210. For example, the storage 219b may be integrated with the over-rider 219. However, it is also to be noted that the storage 219b will preferably not be integrated with the routing table 214 of the multihomed host 210 in order to maintain the above object of the present invention of requiring no changes to conventional prior art routing tables.

It is to be noted that applications running in a host and communicating over a network often utilize sockets for the communicating. Typically these sockets are of a transport layer type. Therefore, prior art systems typically have optimized transport layer protocols, e.g. Stream Control Transmission Protocol, Transmission Control Protocol and User Datagram Protocol, such that while creating an end-to-end connection on a transport layer, the next-hop node to be used is also selected and information about the selected next-hop node is saved in a route cache of the associated socket. In other words, the routing table will be searched once per an end-to-end connection on a transport layer rather than separately for each data packet. Such an optimization typically results in a significant increase in capacity compared to searching the routing table separately for each data packet. If the above described optimization is utilized, e.g. by the multihomed host 210, it is advantageous to observe the optimization when implementing the present invention.

The invention complements conventional destination address based next-hop look-up by allowing the default route of a routing table of a multihomed host to be over-ridden with the default gateway associated with the source address assigned to the data packet. Furthermore, since the invention complements prior art solutions, the invention does not break any existing functionality: e.g. in the case of the above described second arrangement of not assigning a source address to the data packet until after searching the routing table of the sending host, the invention allows assigning the source address in accordance of prior art, as required. The invention may be implemented e.g. by modifying Transmission Control Protocol/Internet Protocol stack functionality of a multihomed host.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. A method, comprising:

assigning a source address to a data packet to be sent from a multihomed host, said multihomed host having at least two associated network addresses, each of said at least two associated network addresses being associated with a corresponding one of at least two default gateways, and said source address being one of said at least two associated network addresses;

determining a destination address of said data packet;

searching a routing table of said multihomed host for a route for said data packet from a plurality of routes of said routing table, said route to match said destination address of said data packet, said routing table having a single default route associated with a particular single one of the at least two default gateways;

examining results of said searching; and in response to one of no route found and a found route being the default route of said routing table associated with the particular single one of the at least two default gateways, selecting one of the at least two default gateways based on the assigned source address, and dispatching said data packet to said selected one of the at least two default gateways associated with said assigned source address to override the particular single one of the at least two default gateways determined using the routing table, wherein each of the above operations are performed in the multi-homed host.

2. The method according to claim 1, further comprising:

in response to the found route being a gateway route determining the default gateway associated with said assigned source address, and dispatching said data packet to said default gateway associated with said assigned source address.

3. An apparatus, comprising:

a source address assigner implemented on a network host, the source address assigner configured to assign a source address to a data packet to be sent from a multihomed host, said multihomed host having at least two associated network addresses, each of said at least two associated network addresses being associated with a corresponding one of at least two default gateways, and said source address being one of said at least two associated network addresses;

a destination address determinator implemented on the network host, the destination address determinator configured to determine a destination address of said data packet;

a routing table searcher implemented on the network host, the routing table searcher configured to search a routing table of said multihomed host for a route for said data packet from a plurality of routes of said routing table, said route to match said destination address of said data packet, said routing table having a single default route associated with a particular single one of the at least two default gateways;

a search examiner implemented on the network host, the search examiner configured to examine results of said search; and an over-rider implemented on the network host, the over-rider configured, in response to one of no route found and a found route being the default route of said routing table associated with the particular single one of the at least two default gateways, to select one of the at least two default gateways based on the assigned source address, and dispatch said data packet to said selected one of the at least two default gateways associated with said assigned source address to override the particular single one of the at least two default gateways determined using the routing table, wherein the apparatus is the multi-homed host.

4. The apparatus of claim 3, wherein said over-rider is further configured, in response to the found route being a gateway route, to determine the default gateway associated with said assigned source address, and dispatch said data packet to said determined default gateway associated with said assigned source address.

5. An apparatus, comprising:

a source address assigning means for assigning a source address to a data packet to be sent from a multihomed host, said multihomed host having at least two associated network addresses, each of said at least two associated network addresses being associated with a corresponding one of at least two default gateways, and said source address being one of said at least two associated network addresses;

a destination address determining means for determining a destination address of said data packet;

a routing table searching means for searching a routing table of said multihomed host for a route for said data packet from a plurality of routes of said routing table, said route to match said destination address of said data packet, said routing table having a single default route associated with a particular single one of the at least two default gateways;

a search examining means for examining results of said searching; and means for over-riding configured, in response to one of no route found and a found route being the default route of said routing table associated with the particular single one of the at least two default gateways, for selecting one of the at least two default gateways based on the assigned source address, and dispatching said data packet to said selected one of the at least two default gateways associated with said assigned source address to override the particular single one of the at least two default gateways determined using the routing table, wherein the apparatus is the multi-homed host.

6. The apparatus of claim 5, wherein said means for over-riding is further configured for, in response to the found route being a gateway route:

determining the default gateway associated with said assigned source address; and dispatching said data packet to said default gateway associated with said assigned source address.

7. A computer program embodied on a non-transitory computer readable medium, the computer program controlling a data-processing device to perform a process, the process comprising:

assigning a source address to a data packet to be sent from a multihomed host, said multihomed host having at least two associated network addresses, each of said at least two associated network addresses being associated with a corresponding one of at least two default gateways, and said source address being one of said at least two associated network addresses;

determining a destination address of said data packet;

searching a routing table of said multihomed host for a route for said data packet from a plurality of routes of said routing table, said route to match said destination address of said data packet, said routing table having a single default route associated with a particular single one of the at least two default gateways;

examining results of said searching; and in response to one of no route found and a found route being the default route of said routing table associated with the particular single one of the at least two default gateways, selecting one of the at least two default gateways based on the assigned source address, and dispatching said data packet to said selected one of the at least two default gateways associated with said assigned source address to override the particular single one of the at least two default gateways determined using the routing table, wherein the above operations are performed in the multi-homed host.

8. The computer program according to claim 7, wherein the process further comprises:

in response to the found route being a gateway route determining the default gateway associated with said assigned source address, and dispatching said data packet to said default gateway associated with said assigned source address.

* * * * *